UNITED STATES PATENT OFFICE.

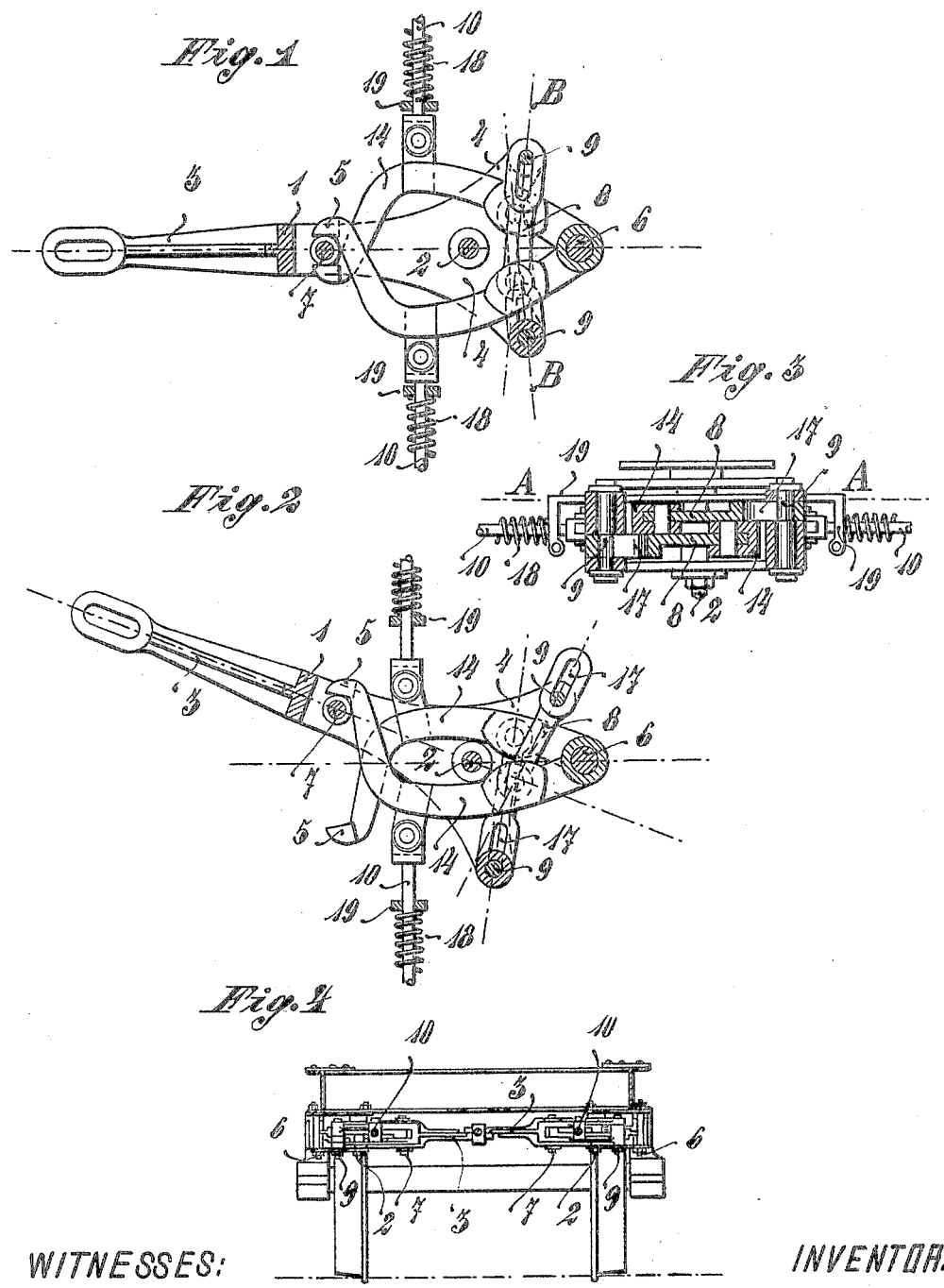

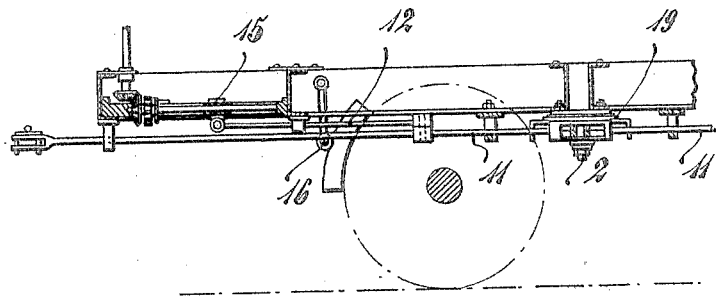
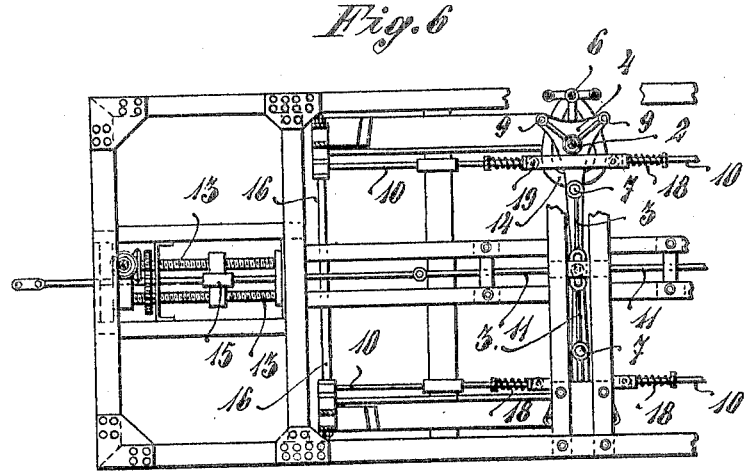

JOSEF EGETZ, OF WAMA, AUSTRIA-HUNGARY.

BRAKE FOR RAILWAY-VEHICLES.

No. 804,588. Specification of Letters Patent. Patented Nov. 14, 1905.

Application filed August 26, 1904. Serial No. 222,315.

*To all whom it may concern:*

Be it known that I, JOSEF EGETZ, mechanician, a subject of the Emperor of Austria-Hungary, and a resident of Wama, a small city in the Bucowina, Austria-Hungary, have invented certain new and useful Improvements in Brakes for Railway-Vehicles, of which the following is a specification.

This invention relates to improvements in brakes for railway-vehicles and the like, and is a brake which is shifted out of its middle position to the right or left by turning a crank. The crank actuates a three-armed lever, which is on the one side connected with hook-levers jointed together and engaging with the bars of the brake and through guide-rods with slotted guides and is on the other provided with an abutment-bolt for guiding the hook-lever, so that on turning the three-armed lever in one direction or the other the brake is fulled, as one of the hook-levers is adjusted by the abutment-bolt, but the other by means of its guide-piece through the short arm of the lever.

Figure 1 shows a section of the shifting device in the relaxed position on the line A A of Fig. 3; Fig. 2, a similar section through the brake in the working position; Fig. 3, a section on the line B B of Fig. 1, whereas Figs. 4, 5, and 6 show the arrangement of the whole brake on a vehicle.

Similar figures refer to similar parts throughout the several views.

Lever 1 pivots on bolt 2 and has one long arm 3 and two shorter arms 4. Between the latter are arranged two one-armed levers 5 and 14, both turning on the bolt 6 and having their ends bent at a right angle like tongs, which cross one another and catch with their bent ends around the bolt 7. Each of these tong-levers is united by a joint on the inside through the guide-rod 8 with the bolt 9 of the opposite short lever-arm 4 of the three-armed lever. The outside of each of the tong-levers is engaged by draw-bars 10, which lead to the brake-shafts 16, Figs. 5 and 6. Between each set of wheels of the vehicle underneath the frame or body of the vehicle such a brake-lever, Figs. 5 and 6, is arranged, and their ends extend to the middle of the vehicle and are united by joints with the draw-bars 11 and 12. To the bars 11 12, preferably journaled between rollers, the nut 15 is fastened, which is shifted by means of the spindle 13.

The working is as follows: If the lever 4 is turned out of its middle position to the right or left, the bars 11 and 12 are shifted in one direction or the other, whereby the levers 3 are turned out of their medium position, Fig. 2. Hereby lever 5 is turned by the bolt 7 and the other lever 14 by one of the shorter arms 4 of the three-armed lever and by means of the guide-rod 8 in a manner that the bars 10, united with the same by joints, are pushed together and the brake-blocks are drawn into the working position. In order that the other guide-rod, which is not acting, may not prevent the movement, the guide-rods are provided with longitudinal slots 17 where they are connected with the short lever-arms 4, so that the guide-rod which is not acting can follow the movement of the arm 4. By pushing together the bars 10 the springs 18, resting against the bow 19, are compressed. If the brake is released, levers 5 and 14 are brought back by these springs into their original position. The brakes arranged on the different vehicles may be united by a bar passing through all and be worked from one point.

Having now particularly described and ascertained the nature of my said invention and in what manner the same is to be performed, I declare that what I claim is—

In a brake for railway-vehicles and the like, the combination of one of the arms 3 of a three-armed lever 3, 4, 4, pivoting on the spindle of the brake, with the free ends of two levers 5, 14 connected with the bars of the brake and with each other by joints, whereas the other two arms 4, 4, are connected with the opposite levers 5, 14 by means of a guide-piece 8 provided with a slot, so that, on the three-armed lever being turned in one direction or the other, arm 3 be adapted to act upon one of the levers 5, 14 directly and one of the arms 4, 4, upon the second of the levers 14 or 5 by means of the guide-piece, substantially as described and for the purpose set forth.

In witness whereof I have hereunto signed my name, this 16th day of June, 1904, in the presence of two subscribing witnesses.

JOSEF EGETZ.

Witnesses:
ALVESTO S. HOGUE,
AUGUST FUGGER.